(12) United States Patent
Arulf et al.

(10) Patent No.: US 6,913,225 B2
(45) Date of Patent: Jul. 5, 2005

(54) CONSTRUCTION AND METHOD OF USE IN A CARRIER ROCKET OR SATELLITE

(75) Inventors: Örjan Arulf, Linköping (SE); Jörgen Remmelg, Linköping (SE); Rolf Thörnkvist, Linköping (SE)

(73) Assignee: Saab Ericsson Space AB, Gothenburg (SE)

( * ) Notice: Subject to any disclaimer, the term of this patent is extended or adjusted under 35 U.S.C. 154(b) by 58 days.

(21) Appl. No.: 10/432,763

(22) PCT Filed: Nov. 14, 2001

(86) PCT No.: PCT/SE01/02517

§ 371 (c)(1),
(2), (4) Date: May 28, 2003

(87) PCT Pub. No.: WO02/42152

PCT Pub. Date: May 30, 2002

(65) Prior Publication Data

US 2004/0061024 A1 Apr. 1, 2004

(30) Foreign Application Priority Data

Nov. 24, 2000 (SE) .............................. 0004310

(51) Int. Cl.$^7$ .............................. B64C 1/06; B64C 39/00
(52) U.S. Cl. ...................... 244/10; 244/131; 244/119; 244/117 R; 244/120; 403/292; 403/296; 403/408.1
(58) Field of Search ......................... 244/10, 130–131, 244/132, 119, 118.2, 118.4, 158 R, 117 R, 120; 403/230, 247, 256–260, 292, 296, 300, 408.1

(56) References Cited

U.S. PATENT DOCUMENTS

| | | | | |
|---|---|---|---|---|
| 1,167,943 A | * | 1/1916 | Short | 244/131 |
| 3,051,517 A | * | 8/1962 | Yalen | 403/230 |
| 3,556,569 A | * | 1/1971 | Bruhn | 403/230 |
| 4,008,971 A | * | 2/1977 | Wah et al. | 403/260 |
| 4,038,118 A | * | 7/1977 | James | 244/132 |
| 4,228,631 A | * | 10/1980 | Geffe | |
| 4,680,902 A | * | 7/1987 | Stefnik et al. | |
| 5,060,888 A | * | 10/1991 | Vezain et al. | 244/158 R |
| 5,308,183 A | * | 5/1994 | Stegeman et al. | 403/259 |

(Continued)

FOREIGN PATENT DOCUMENTS

GB 2 226 801 A * 11/1990 ................. 244/132

Primary Examiner—Michael J. Carone
Assistant Examiner—Lulit Semunegus
(74) Attorney, Agent, or Firm—Carter, DeLuca, Farrell & Schmidt, LLP

(57) ABSTRACT

A construction intended for a carrier rocket or a satellite, comprising a first construction part (21), which is made of a composite material comprising two essentially parallel walls (23, 24) and a core (25) arranged between these walls, a second construction part (22) and means (26, 31; 26', 31, 39) for joining the first and the second construction parts (21, 22). Said means (26, 31; 26', 31, 39) comprising a first fastening element (26) provided with several threads (27), or several first fastening elements (26, 26') provided with at least one thread (27) each, said first fastening element/elements (26; 26') being arranged between the walls (23, 24) of the first construction part (21) in such a way that the threads (27) are accessible via the end surface (28) of the first construction part that faces the second construction part (22). Said first fastening element/elements (26; 26') further being so arranged that the centre axis of the respective thread (27) extends essentially in parallel with the walls (23, 24). Said means further comprising several second fastening elements (31) provided with a thread (33), which second fastening elements extend through cavities (30) in the second construction part (22) and are screwed into said first fastening element/elements (26; 26') so as to secure the two construction parts (21, 22) to each other. The invention also relates to a method for joining a first construction part (21) and a second construction part (22).

12 Claims, 1 Drawing Sheet

U.S. PATENT DOCUMENTS 5,419,650 A * 5/1995 Hoshino ..................... 403/256
5,709,356 A * 1/1998 Avenet et al. .............. 244/132
5,969,287 A    10/1999 Blain et al.
6,012,680 A    1/2000 Edberg et al.
6,050,033 A * 4/2000 Wrightman ................. 403/292

* cited by examiner

CONSTRUCTION AND METHOD OF USE IN A CARRIER ROCKET OR SATELLITE

CROSS-REFERENCE TO RELATED APPLICATIONS

The present application claims the benefit of and priority to PCT Application No. PCT/SE01/02517 filed on Nov. 14, 2001 claiming priority from Swedish Patent Application No. 0004310-9 filed on Nov. 24, 2000, the entire contents of each of which are incorporated herein by reference.

BACKGROUND

1. Technical Field

The present invention relates to a construction and a method used in the production of satellites or carrier rockets for launching satellites, the inventional construction being intended to form a part included in a satellite and a carrier rocket, respectively.

2. Background of Related Art

Satellites and carrier rockets for launching satellites should for reasons of fuel economy have a weight as low as possible while maintaining a strength and rigidity that is sufficient to allow the intended load to be carried. A material making it possible to fulfil these requirements is carbon fibre composite. The type of carbon fibre composite generally used for the production of parts for satellites or carrier rockets comprises two parallel, thin layers of carbon fibre and a core of a lightweight material arranged between these layers. In order to give a good axial strength of the satellite/carrier rocket despite the small thickness of the layers of carbon fibre, which layers should be as thin as possible in order to limit the weight of the satellite/carrier rocket without for that sake jeopardizing the rigidity, said layers are built up of carbon fibres having a high rigidity. A disadvantage with these rigid carbon fibres is that they are brittle. Ring-shaped parts of aluminium are generally used for the attachment of the parts made of carbon fibre composite.

In the production of constructions for satellites and carrier rockets the constructor is regularly confronted with the problem of joining rotationally symmetrical parts made of said type of carbon fibre composite, such as for instance cylinders and cones, with ring-shaped parts of aluminium. This can be accomplished in different ways. Gluing is most optimal as regards weight and rigidity. A problem with the utilization of glue joints is however that the aluminium and the carbon fibre composite in question are extremely incompatible in thermic respects, since the aluminium has a high coefficient of linear expansion whereas the carbon fibre composite has a low coefficient of linear expansion. The satellite and the carrier rocket are subjected to large temperature variations during the launch, and due to the large difference in thermic linear expansion between the aluminium part and the part of carbon fibre composite the glue joint between said parts has a tendency to break up by the temperature variations. As a consequence hereof, one is often obliged to use bolted joints for joining said parts. A disadvantage with bolted joints of the type used today in these situations is however that they are inferior to glue joints as regards rigidity and that they furthermore require an expensive and complicated co-machining of the aluminium ring with the carbon fibre composite. In order to improve the rigidity, the bolt joints are often supplemented with glue joints, which brings about an extra working operation, which further increases the production costs.

OBJECT OF THE INVENTION

It is an object of the present invention to provide a first construction part made of a composite material which is joined with a second construction part by means of a joint offering a high rigidity and at the same time allowing a more cost effective production, as compared to previously known techniques within the field.

SUMMARY OF THE INVENTION

According to the invention, said object is achieved by means of a construction having a first construction part, a second construction part and means for joining the first and second construction parts. The means for joining the first and the second construction part includes a first fastening element provided with several threads, or several fastening elements provided with at least one thread each. The first fastening element/elements being arranged between the walls of the first construction part in such a way that the threads are accessible via the end surface of the first construction part that faces the second construction part. The first fastening element/elements is/are so arranged that the center axis of the respective thread extends essentially in parallel with the walls. The means for joining the first and second construction parts further includes several second fastening elements provided with a thread, which second fastening elements extend through cavities in the second construction part and are screwed into the first fastening element/elements so as to secure the two construction parts to each other.

The inventional solution implies that the construction parts in question are secured together by means of screw joints exerting joining forces essentially directed in parallel with the mantle surface of the construction part made of a composite material. Consequently, these joining forces act essentially in a direction in which the last mentioned construction part has a good rigidity, and the prestressing force hereby obtained between the construction parts implies that a good rigidity of the assembled construction can be obtained. Furthermore, the joining means have such a design that the joining of the two construction parts can be carried out rapidly and easily without requiring glue joints and with a well-defined joining force. Furthermore, screw elements of conventional type can be used, which further contributes in keeping the production costs low. With the inventional construction, the abovedescribed problem with stressings in the joint between the parts included in the construction at temperature variations is avoided.

According to a preferred embodiment of the invention, the first fastening element is ring-shaped and extends a complete turn around the first construction part between its walls. Hereby, said fastening element can in a simple and stable way, preferably by means of glue joints, be integrated in said construction part during the production thereof.

According to a further preferred embodiment of the invention, radial cavities are provided in the first fastening element in the areas between the threads of the fastening element. Hereby, the weight of the fastening element is reduced at the same time as the construction can be made stronger, since the load distribution is improved when the cavities are given a suitable shaping adapted to the load case in question.

According to a further preferred embodiment of the invention, the first fastening element is made of composite material of a type which has a brittleness low enough to allow threads to be formed therein. Hereby, said fastening element can be produced with low weight at the same time as threads of a strength good enough for the purpose can be formed directly in the carbon fibre material of the fastening element.

Further preferred embodiments of the inventional construction will appear from the dependent claims and the subsequent description.

The invention also relates to a method for joining a preferably rotationally symmetrical first construction part and a preferably ring-shaped second construction part in the production of a construction intended for a carrier rocket or satellite, the first construction part being made of a composite material including two essentially parallel walls, preferably in the form of layers of carbon fiber and a core arranged between these walls. The method including the steps of applying a first fastening element provided with several threads, or several fastening elements provided with at least one thread each between the walls of the first construction part that faces the second construction part at the same time as the center axis of the respective thread extends essentially in parallel with the walls. The method further includes the step of passing several second fastening elements, provided with a thread, through cavities in the second construction part and screwed into the first fastening element/elements so as to secure the two construction parts to each other.

BRIEF DESCRIPTION OF THE DRAWINGS

The invention will in the following be more closely described by means of embodiment examples, with reference to the enclosed drawing. It is shown in FIG. 1 a schematical cross-sectional view of a section of a construction intended for a satellite or a carrier rocket, illustrating a bolt joint according to the state of the art, FIG. 2 a schematical cross-sectional view of a section of a construction intended for a satellite or a carrier rocket according to a first embodiment of the invention, FIG. 3 a partially cut sectional view of a section of a fastening element included in a preferred variant of the construction shown in FIG. 2, and FIG. 4 a schematical cross-sectional view of a section of a construction intended for a satellite or a carrier rocket according to a second embodiment of the invention.

DETAILED DESCRIPTION OF PREFERRED EMBODIMENTS

Figure 1:
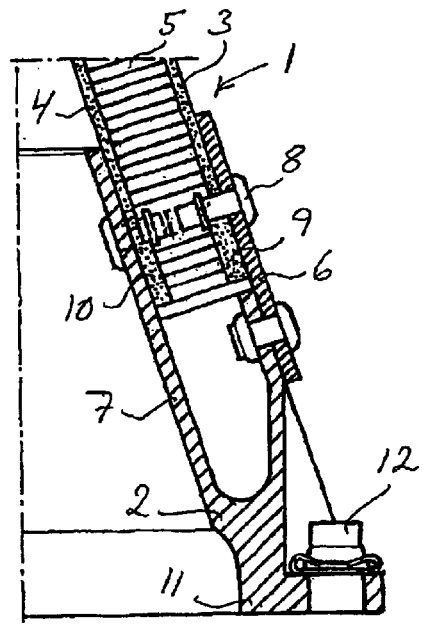

FIG. 1 illustrates a joint according to the state of the art for joining of a rotationally symmetrical first construction part of composite material with a ring-shaped second construction part 2 of aluminium. The rotationally symmetrical construction part 1 has here the shape of a cone and is made of a composite material comprising two parallel layers 3, 4 of carbon fibre and a core 5 of lightweight material arranged between these layers. The respective carbon fibre layer 3, 4 has typically a thickness of ca 1 mm and the core 5 can for instance consist of a honeycomb structure of aluminium foil. When joining construction parts of this kind, one is, as previously mentioned, often obliged to use bolted joints. In this case, the rotationally symmetrical construction part 1 is applied at one of its ends between two shanks 6 and 7 included in the ring-shaped construction part 2, the construction part 1 being fixed to the shanks by means of specially designed bolts 8. In order to better withstand the compressing forces from the bolts 8, the carbon fibre layers can be provided with thickened parts 9 and 10 in the attachment area. The shanks 6, 7 have to very thin in order to offer a flexibility allowing a deflection of the shanks in relation to the body 11 of the ring-shaped construction part when dimensional changes of the ring-shaped part 2 caused by temperature variations occur. Furthermore, an accurate fit between the bolts 8 and the cavities provided for the bolts in the shanks 6, 7 and in the carbon fibre layers 3, 4 is required in order to avoid play in the construction.

When joining the two constructions parts 1, 2, a specific rack is also required for holding the construction parts in the desired position in relation to each other during the joining operation. Consequently, this known type of joints requires a time consuming and costly machining of the construction parts 1, 2 intended to be joined and expensive special bolts 8, at the same time as the assembling work is time consuming and costly. In case the bolt joints are supplemented with glue joints, the time consumption and the costs are further increased.

FIG. 1 also shows a bolt 12 for attachment of the ring-shaped part 2 to a not shown further construction part.

In the embodiments of the present invention described below, the inventional construction comprises a rotationally symmetrical first construction part 21, which is made of a composite material comprising two essentially parallel walls 23, 24 in the form of thin layers of carbon fibre and a core 25 arranged between these walls, which first construction part 21 is joined together with a ring-shaped second construction part 22. The first construction part 21 of the inventional construction may however comprise walls of other materials than carbon fibre. Furthermore, the first and second construction part 21, 22 may have such a design that it is not rotationally symmetrical and ring-shaped, respectively.

Figure 2:
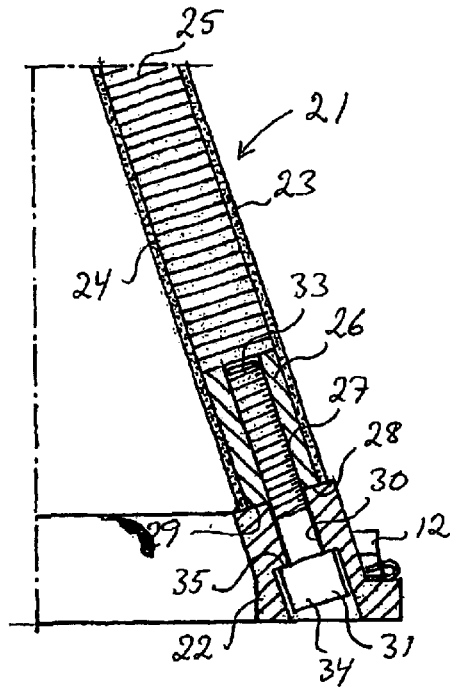

A construction intended for a satellite or a carrier rocket according to a first embodiment of the invention is shown in FIG. 2. This construction comprises an essentially rotationally symmetrical first construction part 21, which is made of a composite material comprising two essentially parallel, thin carbon fibre layers 23 and 24 and a core 25 arranged between these layers. The respective carbon fibre layer can for instance have a thickness of ca 1 mm and the core 25, which is of lightweight material, can for instance be designed as a honeycomb structure of aluminium foil. In the shown example, the rotationally symmetrical construction part 21 has conical shape, but it could also have another shape, for instance cylindrical. Said construction part 21 is at its lower end attached to a ring-shaped second construction part 22, preferably made of aluminium. The ring-shaped part 22 could also be made of any other material with suitable characteristics, such as for instance titanium, steel or Invar. Aluminium has however appeared to be the most suitable material in this connection. At the end of the first construction part 21 that faces the second construction part 22 a first fastening element 26 is arranged between the two carbon fibre layers 23, 24. In this embodiment, the fastening element 26 is ring-shaped and extends a complete turn around the first construction part 21 between its carbon fibre layers 23, 24. This fastening element could also consist of separate segments together forming said ring-shape. The fastening element 26 is provided with a number of threads 27, only one of which is shown in FIG. 2, which are evenly distributed in the circumferential direction of the first construction part. The threads 27 are arranged in such a way that the centre axis of the respective thread 27 extends essentially in parallel with the carbon fibre layers 23, 24. Furthermore, the respective thread is accessible via the end surface 28 of the first construction part 21 that faces the second construction part 22. Said fastening element 26 is applied between the carbon fibre layers 23, 24 during the production of the first construction part 21, the fastening element 26 being fixed to the carbon fibre layers 23, 24 by means of for instance glue joint. In order to keep the weight of the construction low, the fastening element 26 should be made of a material of low weight. Furthermore, said material must be ductile enough to allow threads to be formed in the material, i.e. it must have a sufficient low brittleness. The fastening element 26 can with advantage be made of a carbon fibre material of so-called "High Strain" type, for instance the type of carbon fibre sold under the name TORAYCA T300. The threads are preferably formed in the fastening element 26 in a conventional manner by means of thread tap or by milling. As an alternative to forming the threads directly in the fastening element 26, the fastening element could comprise a body of for instance carbon fibre material having recesses into which bodies provided with threads, for instance thin cylinders of metal, are fixed by means of glue joints. Said bodies provided with threads can for instance consist of commercially available thread inserts.

The second construction part 22 is provided with a shoulder 29, against which the end surface 28 of the first construction part is intended to rest. The construction part 22 is further provided with cavities 30, in the form of through holes in the example shown, for receiving a number of second fastening elements 31. These fastening elements 31, which preferably consist of conventional screws, have an elongated front part 32 provided with a thread 33, corresponding to the threads 27 of the first fastening element 26. The second fastening elements 31 further have a rear enlarged part 34, which is intended to bear on a shoulder 35 arranged in the second construction part 22 adjacent to the cavity 30. When the two construction parts 21, 22 are joined, the rotationally symmetrical first construction part 21 is applied with its end surface 28 against the shoulder 29 of the ring-shaped second construction part 22, whereafter each of the second fastening elements 31 is passed through the respective cavity 30 and screwed into the first fastening element 26. Hereby, a joining force essentially acting in a direction in parallel with the carbon fibre layers 23, 24 of the first construction part is obtained, wherefore the first construction part 21 is able to carry relatively large forces from the screw joints in question. It is realized that these joints give a good joining of the two construction parts 21, 22 at the same time as the fastening elements 26, 31 contribute to the rigidity of the construction. It is further realized that the joining operation by means of these screw joints can be performed considerably easier and more rapidly than the joining by means of the bolt joints shown in FIG. 1.

FIG. 2 also shows a bolt 12 for attachment of the ring-shaped construction part 22 to a not shown further part of the satellite/carrier rocket. Several such bolts 12 are evenly distributed about the second construction part 22.

Figure 3:
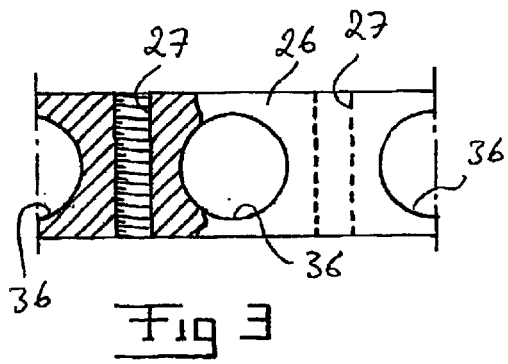

The above mentioned first fastening element 26 can in its walls between the threads 27 with advantage be provided with radial, throughgoing recesses 36, as illustrated in FIG. 3. In this way, the amount of material in the fastening element 26 is reduced and it will consequently obtain a reduced weight. Furthermore, the recesses 36 may by adaption of their shape to the prevailing load case bring about an improved load distribution over the threads 27, which improves the strength of the construction.

As an alternative to a continuous first fastening element 26 of the type described above, the inventional construction could comprise several individual and mutually separated first fastening elements 26. Each individual fastening element 26 would in this case be provided with at least one thread 27 each. The individual fastening elements 26 could consist of an elongated body, for instance cylinder-shaped, having an inner thread 27 with a centre axis extending essentially in parallel with the longitudinal axis of the body. The body could be made of the same type of carbon fibre material as suggested above for the fastening element 26 illustrated in FIG. 2. This type of individual fastening elements are also with advantage applied between the carbon fibre layers 23, 24 during the production of the first construction part 21 and are suitably fixed to these carbon fibre layers 23, 24 by means of glue joint. It is realized that such individual fastening elements 26 should be evenly distributed in the circumferential direction of the rotationally symmetrical first construction part 21. The areas between the individual fastening elements 26 could be filled up by the core material 25.

Figure 4:
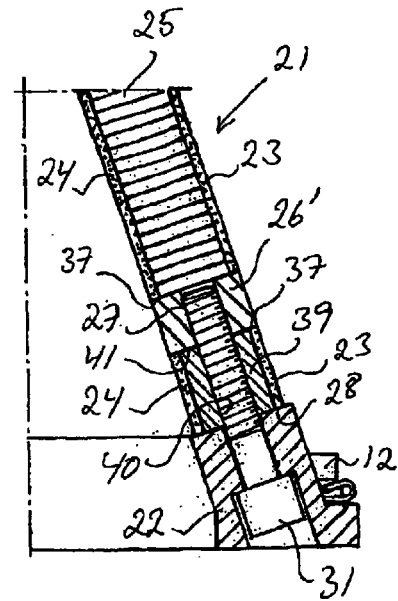

A construction according to a second embodiment of the invention is shown in FIG. 4. In the description of this embodiment, details having its correspondence in FIG. 2 will be denoted with the corresponding reference signs. The construction is here provided with several individual first fastening elements 26'. The respective fastening element 26' consists of a body extending between the carbon fibre layers 23, 24, which body preferably is cylinder-shaped. The respective body 26' has an inner thread 27, which is arranged in such a way that its centre axis extends essentially perpendicular to the extension of the body between the carbon fibre layers 23, 24 and essentially in parallel with the carbon fibre layers. Each of the fastening elements 26' rest against a counter member 39 arranged between the carbon fibre layers 23, 24 at the end of the first construction part that faces the second construction part 22.

The counter member 39 is suitably ring-shaped and extends a complete turn around the first construction part 21 between its carbon fibre layers 23, 24. This counter member 39 could also consist of individual segments together forming said ring-shape. The counter member 39 is provided with a number of through holes 40, one of which being shown in FIG. 4, which are evenly distributed in the circumferential direction of the first construction part. The holes 40 are arranged in such a way that the centre axis of the respective hole 40 extends essentially in parallel with the carbon fibre layers 23, 24. The respective hole 40 must have such a diameter that the threaded front part of a second fastening element 31 of the above described type can pass through the hole. Furthermore, the respective hole is accessible via the end surface 28 of the first construction part 21 that faces the second construction part 22. Said counter member 39 is applied between the carbon fibre layers 23, 24 during the production of the first construction part 21, the counter member 39 being fixed between the carbon fibre layers 23, 24 by means of for instance glue joint. In order to keep the weight of the construction low, the counter member 39 should be made of a material of low weight, for instance of the same type of carbon fibre material as suggested for the fastening element 26 illustrated in FIG. 2.

The abovementioned counter member 39 can in its walls between the holes 40 with advantage be provided with radial, throughgoing recesses in the same way as the fastening element 26 illustrated in FIG. 3. In this way, the amount of material in the counter member 39 is reduced and it will consequently obtain a reduced weight. Furthermore, the recesses may by adaption of their shape to the prevailing load case bring about an improved load distribution, which improves the strength of the construction.

As an alternative to a continuous counter member 39 of the type described above, the inventional construction could comprise several individual and mutually separated counter members 39. Each individual counter member 39 would in this case be provided with at least one hole 40 each. The individual counter members 39 could consist of an elongated body, for instance cylinder-shaped, having an inner hole 40 with a centre axis extending essentially in parallel with the longitudinal axis of the body.

As mentioned above, the fastening elements 26' are intended to rest against said counter member 39. According to a first alternative, the respective fastening element 26' rests against an upper end surface 41 of the counter member 39. According to a second alternative, the counter member 39 extends, as seen in the longitudinal direction of the holes 40 and the threads 27, on both sides of the fastening elements 26', in which case the respective fastening element 26 is mounted in a cavity arranged in the counter member 39, which cavity extends essentially perpendicular to the longitudinal direction of the adjacent hole 40.

When the construction parts 21, 22 are to be joined, the respective fastening element 26' is applied between the carbon fibre layers 23, 24 via a recess 37 arranged in one of the carbon fibre layers, the fastening element 26' being directed in such a way that its thread 27 connects to the adjacent hole 40 in the counter member 39 and the centre axis of the thread 27 extends essentially in parallel with the carbon fibre layers 23, 24. Thereafter, the threaded front part of one of the second fastening elements 31 is via the hole 40 screwed into the thread 27 of the first fastening element 26'. The second fastening elements 31 have in the embodiment shown in FIG. 4 the same design as the corresponding fastening elements of the embodiment according to FIG. 2. The respective fastening element 26' is fixed to the first construction part 21 by being pressed, by means of the traction force developed at the screwing of the second screw-shaped fastening element 31 into the first fastening element 26', against the counter member 39 arranged in the first construction part 21. By this traction force, the first construction part 21 is also pressed against the second construction part 22 via the counter member 39, whereby a force that joins the parts 21, 22 together is obtained. If so desired, the fastening elements 26' could also be applied between the carbon fibre layers 23, 24 in advance.

According to an alternative embodiment, not shown, of the first fastening elements 26' described in connection with FIG. 4, the first fastening elements comprise preferably a semicylinder-shaped body with a throughgoing, untapped hole, which hole has such a diameter that the threaded front part of one of the second fastening elements 31 can pass therethrough. The curved surface of the semicylinder-shaped body is here intended to face the second construction part 22, the counter member having a recess with a shape suitable for receiving the semicylinder-shaped body. In this case, the first fastening element 26' further comprises a threaded fastening member, such as for instance a conventional nut, which is arranged to bear against the body at the surface of the body that is turned away from the first construction part 22, with the centre axis of its thread extending essentially in parallel with the carbon fibre layers 23, 24. When the construction parts 21, 22 are joined together, the body and fastening member included in the fastening element 26' are oriented in such a way that the through hole of the body connects to the adjacent hole 40 of the counter member 39 and the thread of the fastening member connects to the through hole of the body. Thereafter, the threaded front part of one of the second fastening elements 31 is screwed via the hole 40 of the counter member 39 and the hole of the body into the thread of the fastening member so as to achieve a traction force that joins the construction parts 21, 22.

The first fastening elements 26' included in the embodiment according to FIG. 4 are preferably made of a metal material, for instance aluminium, titanium or stainless steel.

The invention is of course not in any way limited to the preferred embodiments described above, on the contrary, several possibilities of modifications thereof should be evident for a person skilled in the art, without thereby deviating from the basic idea of the invention as defined in the appended claims.

What is claimed is:

1. A construction to be used in a carrier rocket or a satellite, the construction comprising:
   a first essentially rotationally symmetrical construction part made from a composite material, the first construction part including:
      two essentially parallel walls; and
      a core arranged between the two walls;
   a second essentially ring shaped construction part; and
   means for joining the first and the second construction parts, the means for joining the first and second construction parts including:
      a first ring-shaped fastening element extending a complete turn around the first construction part, between the two walls of the first construction part, and being provided with several threads essentially evenly distributed in the circumferential direction of the first construction part, the first fastening element being arranged between the two walls of the first construction part in such a way that the threads are accessible via an end surface of the first construction part that faces the second construction part, wherein the first fastening element is so arranged that a center axis of the respective thread extends essentially in parallel with the pair of walls; and
      a plurality of second fastening elements, each provided with a thread, the second fastening elements extending through cavities formed in the second construction part and are screwed into the first fastening element so as to secure the two construction parts to one another.

2. A construction according to claim 1, wherein the two walls include layers of carbon fiber.

3. A construction according to claim 1, wherein radial recesses are provided in the first fastening element in the areas between the threads of the first fastening element.

4. A construction according to claim 1, wherein the first fastening element is fixed between the two walls by means of a glue joint.

5. A construction according to claim 1, wherein the first fastening element is made of carbon fiber material.

6. A construction according to claim 5, wherein the carbon fiber material in the first fastening element is of a type having a brittleness low enough to allow the threads to be formed therein.

7. A construction to be used in a carrier rocket or a satellite, the construction comprising:
   a first construction part defining an end surface, the first construction part including:
      a pair of substantially parallel walls;
      a core disposed between the pair of walls; and
      a plurality of first fastener elements fixedly secured between the pair of walls in close proximity to the end surface of the first construction part, each first fastener element being configured to operatively engage a second complementary fastener element;
   a second construction part operatively associatable with the end surface of the first construction part, the second construction part defining at least one cavity therethrough; and a plurality of second fastener elements for joining the first and the second construction parts to one another, each second fastener element including:
- a threaded part extendable through the cavity of the second construction part and configured to engage a respective one of the plurality of first fasteners; and
- an enlarged head part, integrally formed with the threaded part, and having a configuration preventing passage of the second fastener element through the cavity of the second construction part.

8. A construction according to claim 7, wherein the pair of walls include layers of carbon fiber.

9. A construction according to claim 7, wherein the first construction part is rotationally symmetrical and the second construction part is substantially ring-shaped.

10. A construction according to claim 9, wherein through-going recesses are provided in the first fastening element.

11. A construction according to claim 7, wherein each first fastening element is made of carbon fiber material.

12. A construction according to claim 11, wherein said first fastening elements are made of aluminium.

* * * * *